(12) United States Patent
Woodhouse et al.

(10) Patent No.: US 7,144,594 B2
(45) Date of Patent: Dec. 5, 2006

(54) METHOD FOR CREATING A RELIEF MOLD FOR COMESTIBLE PRODUCTS

(75) Inventors: James F. Woodhouse, Killingworth (GB); Stan Holtom, Ashington (GB); John R. Russell, Bedlington (GB); Angela Wright, Ashington (GB)

(73) Assignee: DecoPac, Inc., Anoka, MN (US)

( * ) Notice: Subject to any disclaimer, the term of this patent is extended or adjusted under 35 U.S.C. 154(b) by 120 days.

(21) Appl. No.: 10/758,236

(22) Filed: Jan. 15, 2004

(65) Prior Publication Data

US 2004/0213878 A1    Oct. 28, 2004

(30) Foreign Application Priority Data

Jan. 15, 2003    (GB)    ................... 0300908.1

(51) Int. Cl.
*A23G 1/50*    (2006.01)

(52) U.S. Cl. ...................... 426/383; 426/104

(58) Field of Classification Search ................ 426/383, 426/104, 87, 515; 264/219, 553, 338, 132, 264/40.1

See application file for complete search history.

(56) References Cited

U.S. PATENT DOCUMENTS

| | | | | |
|---|---|---|---|---|
| 2,468,731 | A | * | 5/1949 | Borkland ............... 156/59 |
| 4,024,287 | A | * | 5/1977 | Golchert |
| 4,369,200 | A | * | 1/1983 | Iwao et al. |
| 4,778,683 | A | * | 10/1988 | Newsteder |
| 5,017,394 | A | * | 5/1991 | Macpherson et al. |
| 5,800,601 | A | * | 9/1998 | Zou et al. |
| 5,834,047 | A | * | 11/1998 | Ahn |
| 6,063,412 | A | * | 5/2000 | Hoy |
| 6,267,997 | B1 | * | 7/2001 | Ream et al. |
| 6,376,000 | B1 | * | 4/2002 | Waters |
| 6,432,461 | B1 | * | 8/2002 | Dixon |
| 6,623,553 | B1 | * | 9/2003 | Russell et al. |
| 6,660,318 | B1 | * | 12/2003 | Yoon et al. |
| 2003/0215593 | A1 | * | 11/2003 | Morgan et al. |

* cited by examiner

*Primary Examiner*—Arthur L. Corbin
(74) *Attorney, Agent, or Firm*—Fish & Richardson P.C.

(57) ABSTRACT

A method for applying a color image to a non-planar comestible may include applying a color image onto a substantially planar carrier and deforming the carrier to form a non-planar relief mold of a three-dimensional image, including deforming the color image whereby the deformed color image is proportionate relative to, i.e., is in register with, the three-dimensional image. A comestible material, e.g., chocolate, may be deposited into the relief mold to substantially overlie the color image. The comestible material may be removed from the relief mold, with the color image applied thereto. In one implementation, the color image may be applied to the substantially planar carrier by screen printing one or more colors forming the color image onto the carrier using an edible ink composition.

29 Claims, 10 Drawing Sheets

METHOD FOR CREATING A RELIEF MOLD FOR COMESTIBLE PRODUCTS

CROSS REFERENCE TO RELATED APPLICATIONS

This application claims priority to a pending application filed in Great Britain on Jan. 15, 2003, having application number 0300908.1, which application is hereby incorporated herein by reference in its entirety.

TECHNICAL FIELD

This invention relates to techniques and compositions for applying a decorative image to a comestible product.

BACKGROUND

Decorative images are frequently applied to confections and food articles (i.e., comestible products), such as cakes, pastries, ice cream, and baked goods. Frequently, decorative images are borne on an edible substrate that is transferred to a surface of a food article to be decorated. The edible substrates are often thin, fragile layers of starch-based edible material. Such materials facilitate transfer of the decorative image to the surface of the food article without detracting from the texture or appearance of the original food article. Preferably, the edible substrates may be relatively durable so as to withstand the printing and transferring processes.

Edible substrates may be deposited onto a releasable backing paper or film to provide support throughout the printing process and to facilitate handling of the edible substrate. After the edible substrate is properly transferred to the food article, the backing paper may be peeled away to show the decorative image on the surface of the food article.

Edible substrates can be formed by depositing an edible formulation on a backing paper using "screen printing" process. In such processes, a screen fixture is positioned over the surface of the backing paper and the edible material is manually forced through a screen mesh using a squeegee or other similar device. The screen printing process can be used to apply a decorative image to a planar substrate for transfer to a planar target surface, such as the flat surface of a cake.

Applying a decorative image to a non-planar (i.e., three-dimensional) target surface is typically more laborious and time-consuming. Transferring a decorative image from release layer (i.e., a 2D surface) onto a non-planar surface (i.e., a 3D surface) can result in skewing or distortion of the decorative image, for example, due to raised areas on the non-planar surface distorting the originally 2D decorative image.

Accordingly, conventional techniques for applying a decorative image to a non-planar surface include hand painting a multi-colored image onto a relief mold surface using a pre-tempered colored chocolate, and thereafter filling the mold with a comestible material, such as chocolate, and, upon cooling, demolding the chocolate with the multi-colored image applied. The hand-painting technique is not conducive to mass production, due to the time and expense involved.

SUMMARY

In various implementations, a method for applying a color image to a non-planar comestible may include applying a disproportionate color image onto a substantially planar carrier and deforming the carrier to form a non-planar relief mold of a three-dimensional image, whereby the deformed color image is proportionate relative to the three-dimensional image. A comestible material, such as chocolate or a chocolate compound, may be deposited into the relief mold to substantially overlie the color image. The comestible material may be removed from the relief mold, with the color image applied thereto. In one implementation, the disproportionate color image may be applied to the substantially planar carrier by screen printing one or more colors forming the color image onto the carrier using an edible ink composition.

Edible ink compositions can include one or more of each of the following: a viscosity controller, a film forming compound, an emulsifier, and a food grade colorant. Optional ingredients include one or more plasticizers or humectants. Edible ink compositions are generally prepared as aqueous solutions, e.g., for application to a carrier.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATED EMBODIMENT

A technique for applying a decorative image to a three-dimensional surface of a comestible product may include applying a disproportionate image to a substantially planar carrier and deforming the carrier into a three-dimensional relief mold, such that upon being deformed, the decorative image is proportionate to (i.e., aligns with) the three-dimensional (3D) surface. The deformed decorative image can then be applied to a three-dimensional target surface. The end product may be a comestible product, for example, a chocolate figurine or cake decoration, having at least one substantially non-planar surface, with a decorative image of one or more colors applied to the non-planar surface of the comestible product. For example, an edible chocolate figurine can be shaped as a popular cartoon character and a three-dimensional image depicting the character can be applied to a surface of the figurine.

Figure 1A:
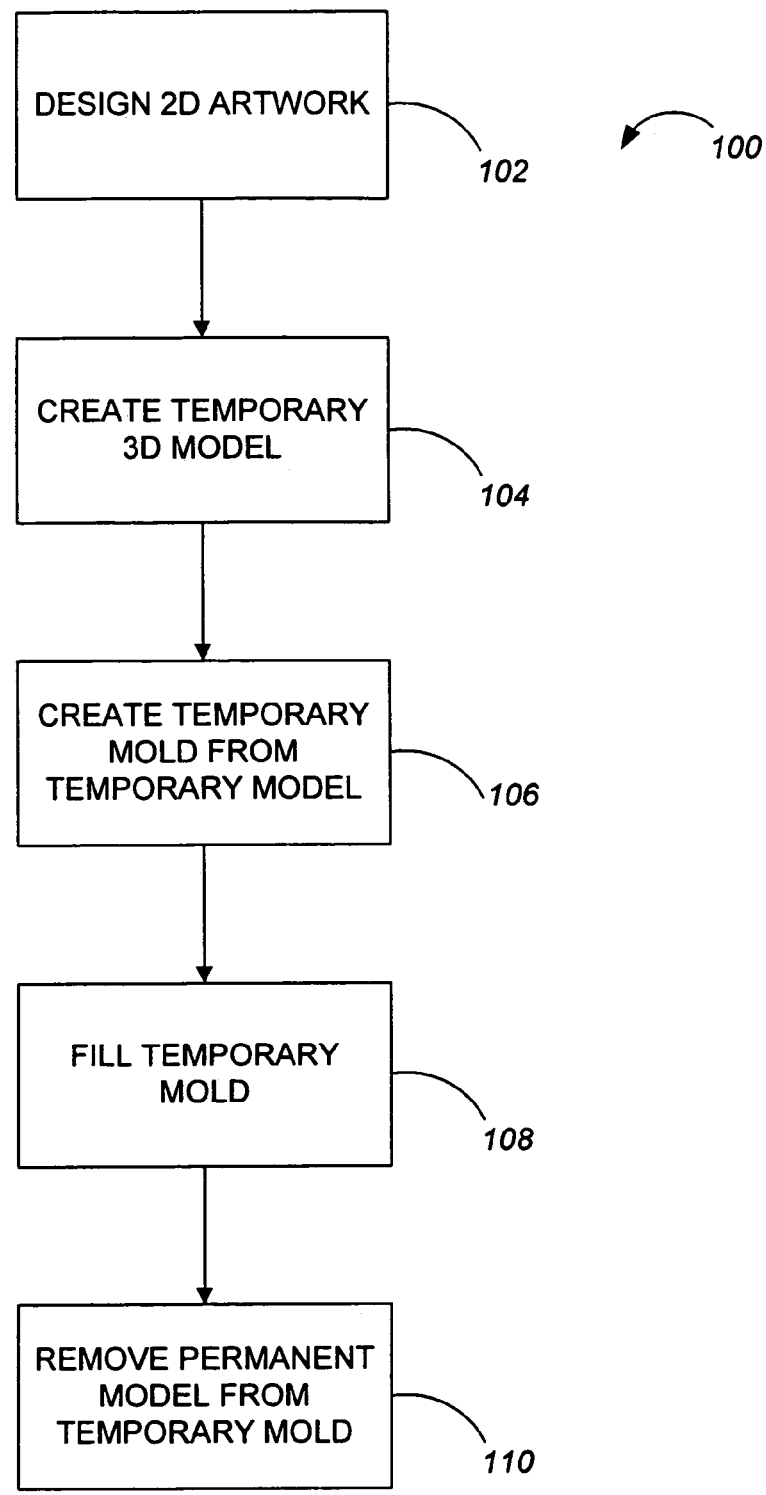
FIG. 1A is a flowchart showing a process for creating a 3D model.

An iterative process described below can be used to create an image that is suitably disproportionate to an original 2D artwork, such that when applied to a carrier and deformed into a 3D relief mold, the image aligns with the corresponding 3D impression formed in the carrier (i.e., the relief mold). Referring to FIG. 1A, a process 100 for creating a 3D model representative of a comestible product to which a multi-colored decorative image is to be applied is shown.

Figure 2:
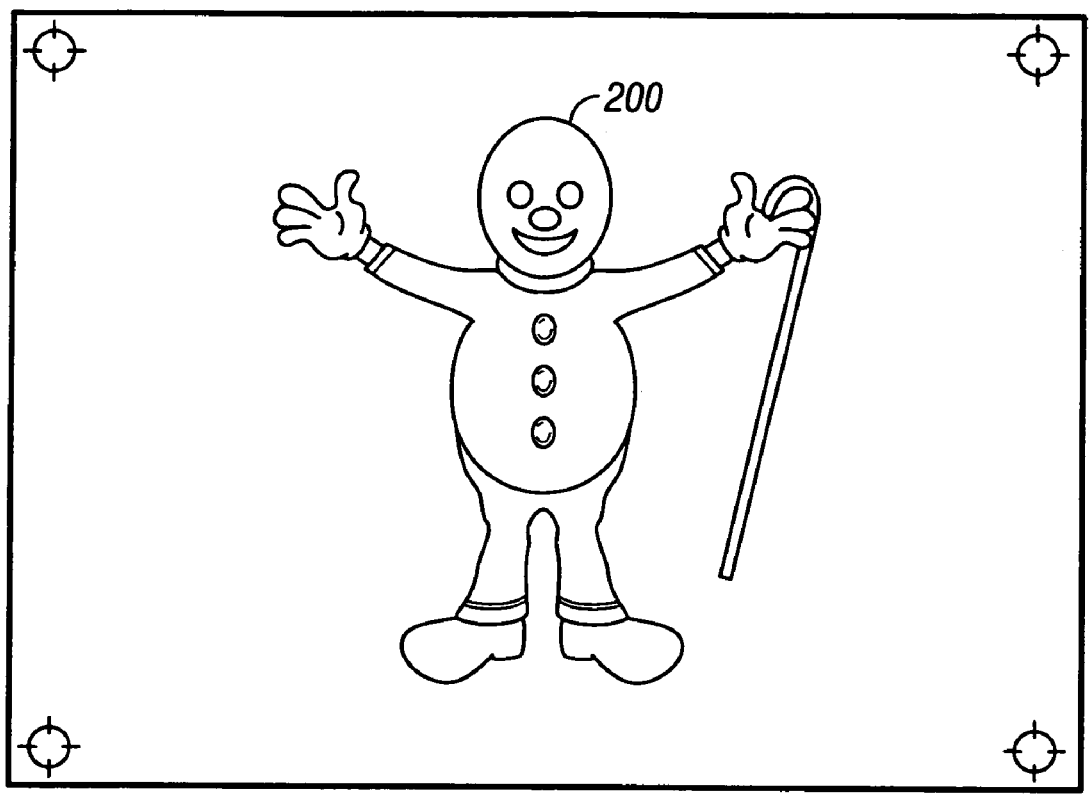
FIG. 2 shows a 2D artwork representing a 3D decorative image.

In a first step, a two-dimensional (2D) artwork is designed illustrating a two-dimensional representation of the three-dimensional decorative image to be applied to the three-dimensional surface of the comestible product (step 102). For example, referring to FIG. 2, a 2D artwork 200 of an image of a cartoon man (the "Cartoon Man") is shown. A 3D temporary model of the 2D artwork, i.e., a 3D Cartoon Man, is prepared based on the 2D artwork (step 104). The temporary model may be hand sculpted from a pliable material that can be hardened, such as plasticine or modeling wax. Alternatively, the temporary model can be machined, for example, using a CNC (computer numerical control) machine or pantograph, and using a metal or plastic material.

A 3D temporary relief mold is created from the temporary model, for example, by pouring a liquid, silicon rubber over the temporary model and allowing the rubber to harden (step 106). The rubber can then be separated from the temporary model, thereby forming the 3D temporary relief mold. A food grade material that can be used to form a solid, more durable permanent model, such as resin, brass, aluminum or stainless steel, is poured in a liquid form into the temporary relief mold (step 108). The material is allowed to solidify and is removed from the temporary relief mold, resulting in a permanent model representative of the comestible product to which a multi-colored decorative image is to be applied (step 110).

Figure 1B:
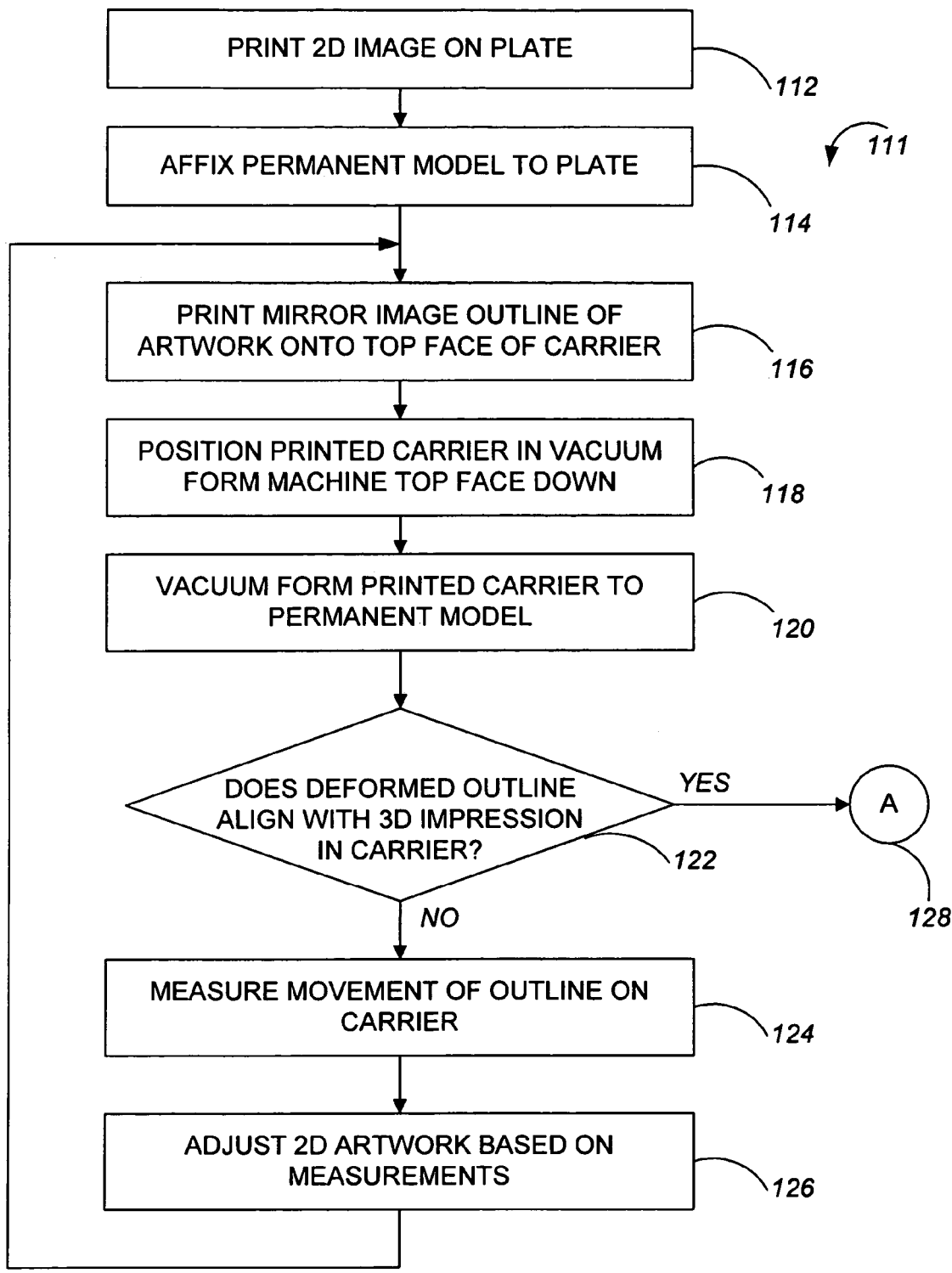
FIGS. 1B and 1C are flowcharts showing a process for applying a color image to a 3D comestible product.
Figure 3A:
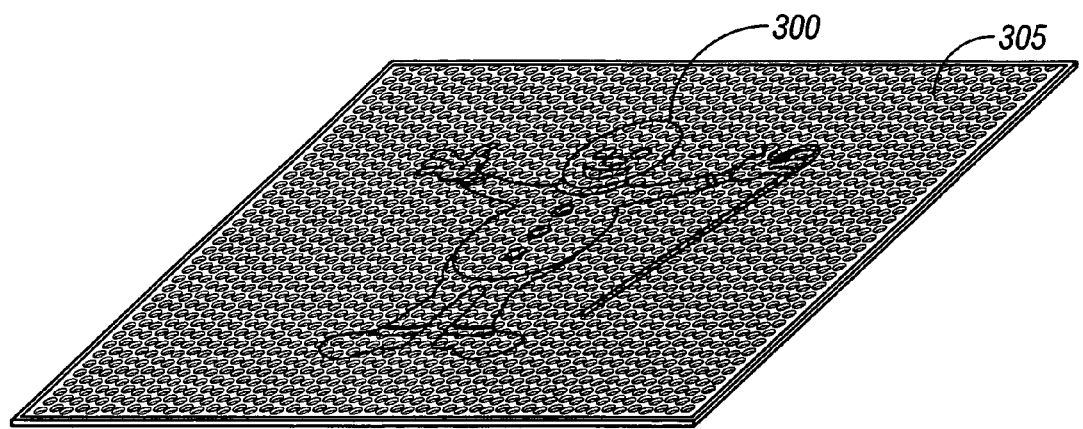
FIG. 3A shows an outline of an image printed onto the surface of a substrate.
Figure 3B:
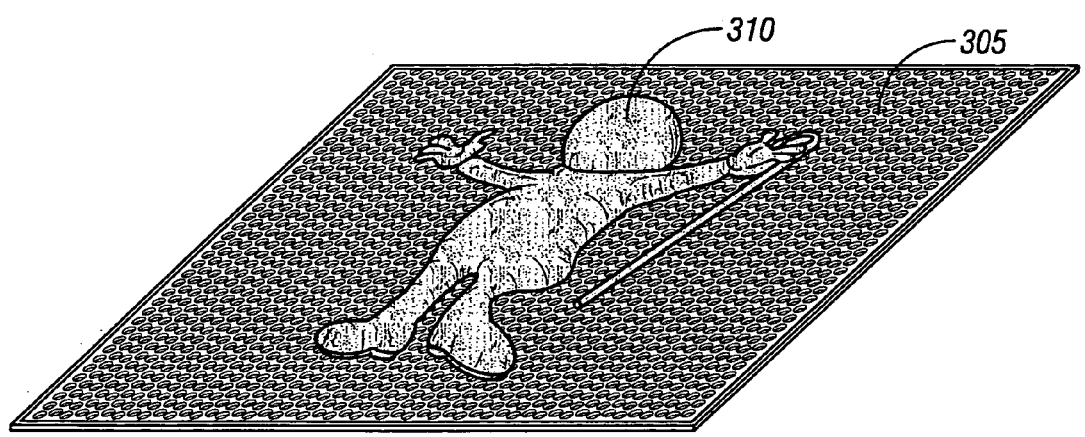
FIG. 3B show a 3D model affixed to the surface of the substrate of FIG. 3A.

FIG. 1B is a flowchart showing a process 111 for creating an adjusted 2D artwork that is suitably disproportionate to the original 2D artwork 200, such that when applied to a carrier and deformed into a 3D relief mold, the image represented by the adjusted 2D artwork aligns with the corresponding 3D impression formed in the carrier (i.e., the relief mold). Referring to FIG. 3B, in a first step, the permanent model 310 (which can be formed as per FIG. 1A) is affixed to a substrate 305 that will be used during a vacuum forming process. Optionally, before affixing the permanent model to the substrate, an outline 300 of the decorative image (i.e., a black outline without any colored regions) can be applied to the substrate 305, as shown in FIG. 3A, and the permanent model 310 then aligned to the outline 300 and mounted onto the substrate 305. This step can be particularly useful for commercial mass production of a comestible product, when multiple permanent models may be created and affixed to a single substrate, such that multiple relief molds can be simultaneously created. In such an application, printing corresponding multiple outlines of the image onto the substrate before affixing the multiple permanent models facilitates a later step of align a carrier to the models.

The permanent model 310 can be affixed to the substrate 305 using an adhesive, screws or other convenient means. The substrate 305 can be formed from a perforated stainless steel, for example, such that during a vacuum forming process air can be extracted through the perforations. Optionally, holes can be drilled through the permanent model 310, which holes align with holes or perforations in the substrate 305, such that during a vacuum forming process air can be extracted through the holes, which can be particularly useful in detailed regions of the permanent model 310.

The outline 300 can be applied to the substrate 305 using any convenient printing technique, for example, screen printing. The original 2D artwork 200 (FIG. 2) can be used to prepare a screen, and using conventional screen printing techniques, the outline 300 is printed onto the substrate 305.

A food grade substrate is used as a carrier for an edible, decorative image that will be applied to the three-dimensional comestible. In one implementation, the substrate is a thermoplastic sheet made of, for example, virgin grade polyvinyl chloride, polypropylene, polycarbonate, acrylic or high impact polystyrene. The carrier may be transparent or opaque, although transparency can assist certain steps in the process as noted below. In one implementation, the carrier has a thickness in the range of approximately 100–400 microns, and can be, for example, 275 microns thick.

Figure 4A:
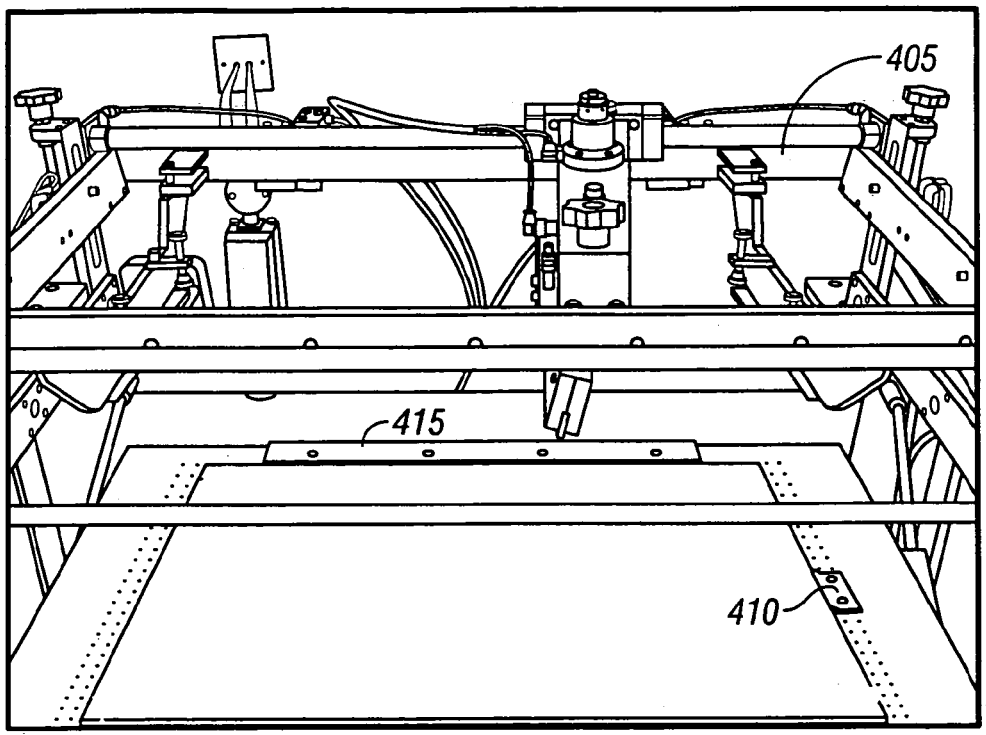
FIG. 4A shows a carrier aligned in a screen printing machine.
Figure 4B:
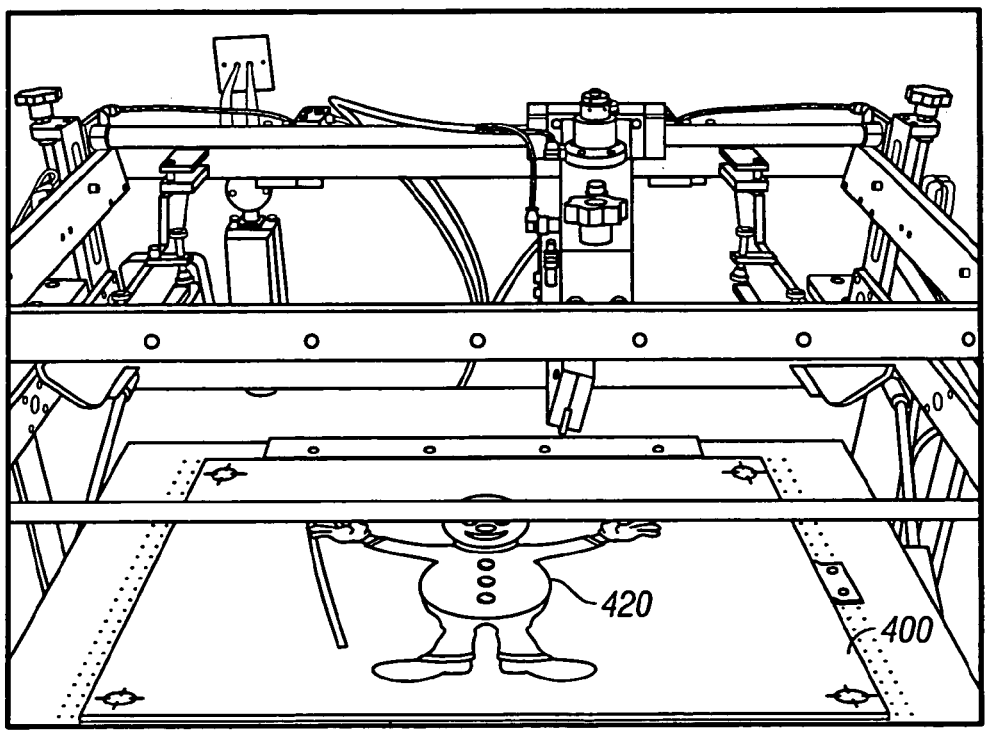
FIG. 4B shows the carrier of FIG. 4A with a mirror image of the artwork of FIG. 2 printed thereon.

A mirror image outline of the original 2D artwork 200 is printed onto the carrier (step 116). In one implementation, the original 2D artwork 200 is used to create a screen of the mirror image outline and the mirror image outline is screen printed onto the carrier. Referring to FIG. 4A, the carrier 400 is shown positioned within a screen printing machine 405. The carrier 400 can be aligned to a lay edge 410 (i.e., a guide) along a width-wise side 411 of the carrier 400 and a second lay edge 415 along a length-wise side 414 of the carrier. The lay edges 410, 415 can be flat steel plates to guide or stop a sheet of material at substantially the same place each time a sheet is positioned within the machine. The mirror image screen is then used with the screen printing machine 405 to print the mirror image outline 420 onto the carrier 400, as depicted in FIG. 4B.

In one implementation, the blank carrier 400 can be aligned within the screen printing machine 405 as follows, such that the mirror image outline is printed at the appropriate location on the carrier 400 so when the printed carrier 400 is placed within a vacuum forming machine, the mirror image outline generally aligns with the permanent model 310 (although other techniques to ensure alignment can be used). Using a transparent carrier 400, an operator places the blank carrier 400 face down over the permanent model 310 affixed to the plate 305 and hand marks registration points onto the backside of the blank carrier 400. For example, the operator can trace an outline of the permanent model 310 or trace certain features (e.g., the eyes and mouth of the Cartoon Man) onto the carrier 400 using a felt tip pen (the tracings being the registration points). When the carrier 400 is then placed (face-up) within the screen printing machine 405 and the screen of the mirror image outline is positioned over the carrier 400, the position of the carrier 400 can be adjusted until the mirror image outline on the screen is aligned to the registration points. That is, when the carrier 400 is aligned to the screen, the registration points marked onto the transparent carrier 400 will be visible to an operator through the mirror image outline on the screen. The mirror image outline will thereby be printed in the appropriate region on the carrier 400, such that when the printed carrier 400 is placed within the vacuum forming machine within the lay edges (described below), the permanent model 310 will contact the printed carrier 400 at a location coinciding with the mirror image outline 420.

Figure 5:
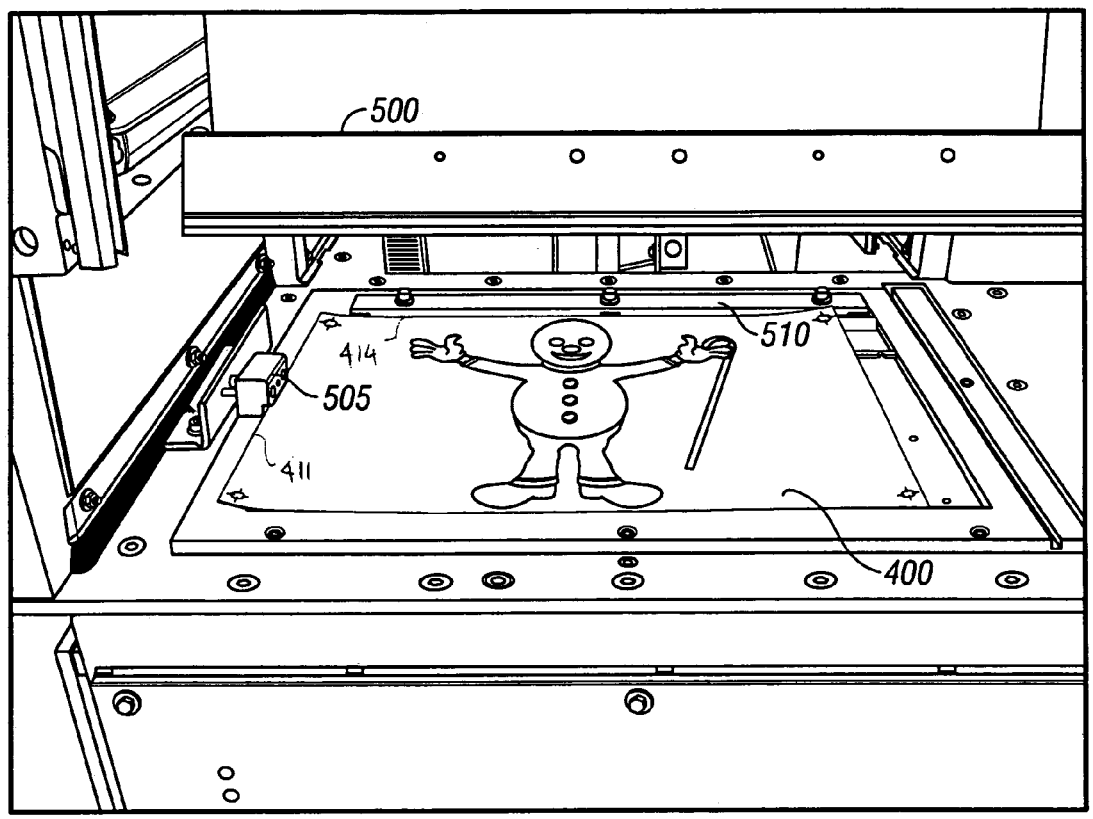
FIG. 5 shows the carrier of FIG. 4B aligned in a vacuum forming machine.

Referring to FIG. 5 and again to FIG. 1B, the printed carrier 400 is positioned face down (i.e., printed side down) in a vacuum forming machine 500 (step 118). The printed carrier 400 is aligned to a lay edge 505 along a width-wise side of the carrier 400 and to a second lay edge 510 along a length-wise side of the carrier. The printed carrier 400 can be warmed to increase pliability, for example, to a temperature in the range of approximately 60 to 80 degrees Celsius, such as 75 degrees Celsius if using a polyvinyl chloride material to form the carrier 400. A tray (not shown) upon which the plate 305 and permanent model 310 are positioned is raised up to meet the printed carrier 400 and a vacuum is applied to deform the printed carrier 400 to the permanent model 310 (step 120). The carrier 400 once separated from the permanent model 310 is impressed with the 3D representation of the decorative image, as shown in FIGS. 6A and 6B, and thereby forms a 3D relief mold 600.

One example of a vacuum forming machine is a vacuum forming unit available from Illig UK Ltd. of Bedfordshire, United Kingdom. The mold tool (i.e., the plate 305 with the permanent model 310 affixed), in male or female format, used in the vacuum forming machine can be made from aluminum, aluminum resin, brass, copper or magnesium and can be coated with a heat resistant, non-stick material, such as TEFLON™, Xylan or the like.

Referring to FIG. 6A and again to FIG. 1B, the mirror image outline 620 of the original 2D artwork 200 that was printed onto the carrier 400 is deformed during the vacuum forming process, by virtue of the carrier being stretched to form a 3D relief mold. The deformed outline 620 is examined to determine whether the outline aligns with the 3D impression 600 of the decorative image now formed in the carrier (step 122). If the deformed outline 620 does not align with the 3D impression 600 ("No" branch of step 122), then the amount by which the outline should be moved when printed onto the carrier before deformation—so that upon deformation the outline will align with the 3D impression 600—is measured (step 124). Deformation generally occurs due to the height or depth of the 3D impression.

Figure 6A:
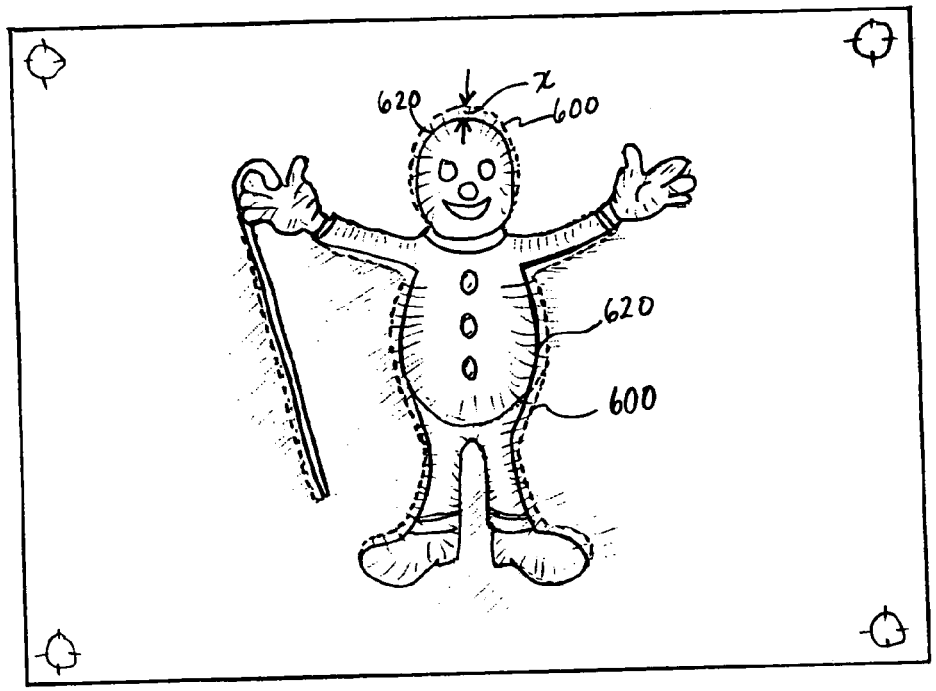
FIG. 6A shows the carrier of FIG. 4B impressed with the 3D model of FIG. 3B.
Figure 6B:
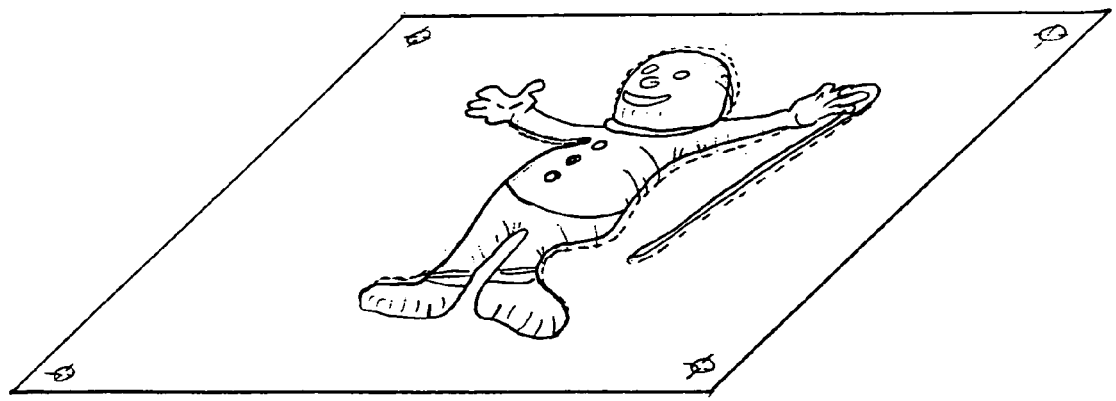
FIG. 6B shows the reverse side of the carrier of FIG. 6A.

In FIG. 6A the mirror image outline 620, which is shown as a solid line, and the boundary of the 3D impression 600, which is shown as a dotted line, appear to align in some regions and are not aligned in others. For example, at the top of the Cartoon Man's head, the outline 620 is a distance x from the boundary of the 3D impression 600 corresponding to the top of the Cartoon Man's head. Distances of misalignment, such as distance x, are measured where the outline 620 does not align to a corresponding feature formed in or by the 3D impression 600.

Figure 7A:
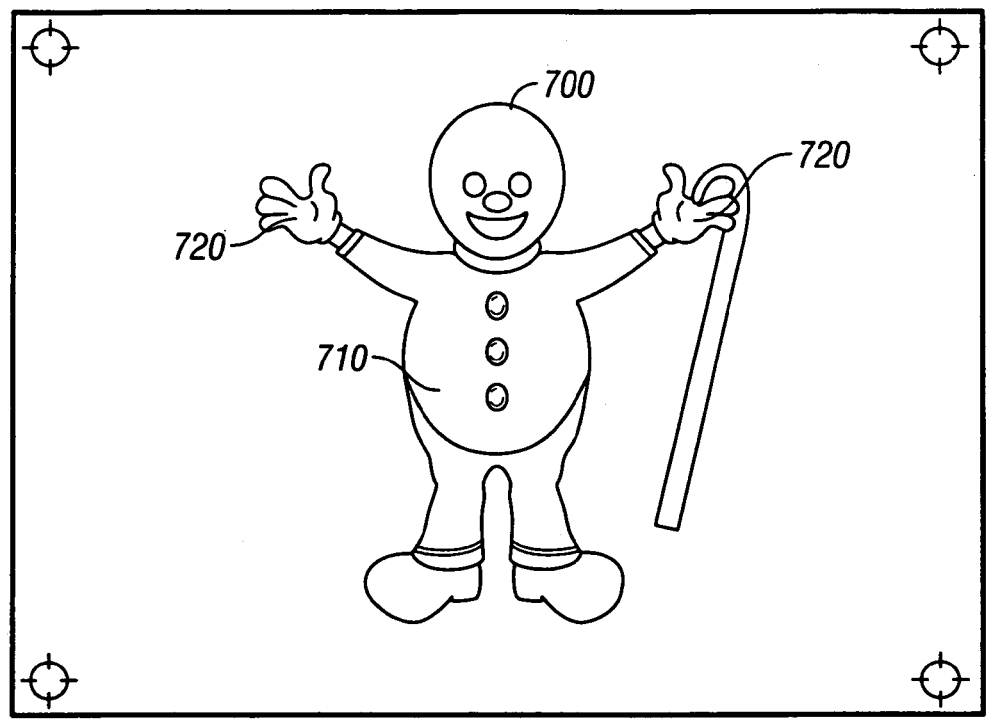
FIG. 7A shows a disproportionate version of the 2D artwork of FIG. 2.
Figure 7B:
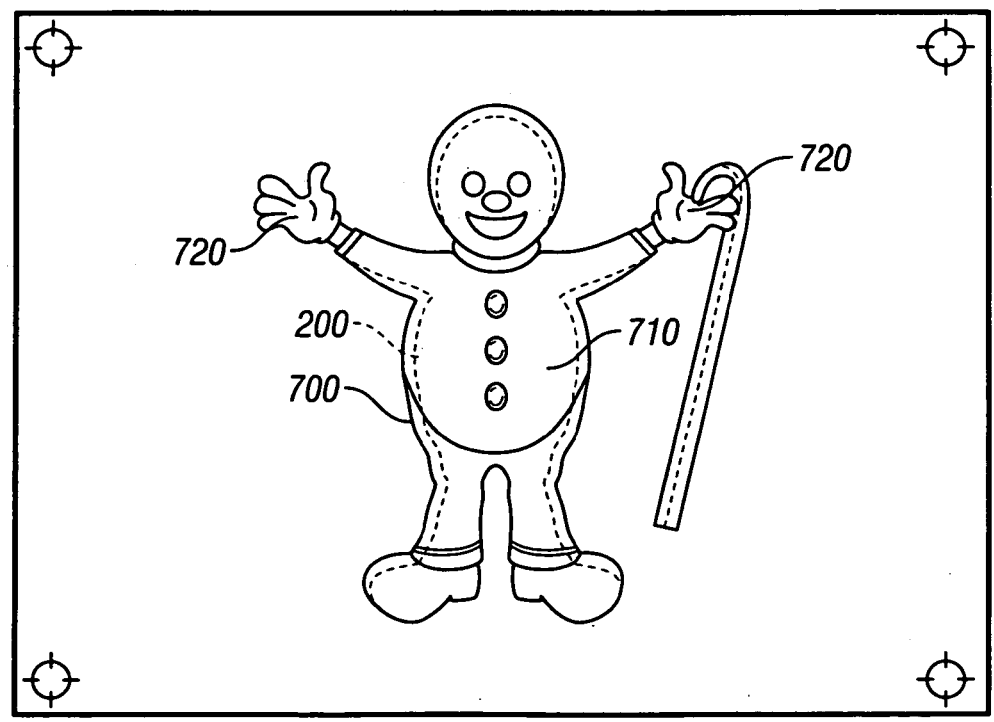
FIG. 7B shows the disproportionate 2D artwork of FIG. 7A overlaying the 2D artwork of FIG. 2.

An example of a disproportionate 2D artwork 700 is shown in FIG. 7A, and is shown overlaying the original 2D artwork 200 represented as a dotted line in FIG. 7B, to illustrate the adjustments made to the original 2D artwork 200. For example, the girth in the stomach region 710 of the Cartoon Man results in more deformation in the stomach region 710 than in less protruding areas of the Cartoon Man, such as the hands 720. Accordingly, the deformed outline is less likely to align to the 3D impression in the stomach region 710 due to the outlining deforming considerably in this region.

Referring again to FIG. 2, the original 2D artwork 200 is adjusted based on the measurements to create an adjusted 2D artwork (step 126). For example, the Cartoon Man's head can be adjusted based on the measurement of the distance x between the outline 620 and the 3D impression 600. The adjusted 2D artwork is disproportionate to the original 2D artwork 200, so that when an outline based on the adjusted 2D artwork is applied to the carrier and deformed to create a 3D relief mold, the outline aligns with the 3D impression formed in the carrier (i.e., the 3D relief mold). That is, for example, at the top of the Cartoon Man's head the printed outline based on the adjusted 2D artwork will align with the boundary of the 3D impression, as compared to the obvious misalignment depicted in FIG. 6A. Typically, one or more additional iterations of the process described above, in particular steps 116–126 are required to finally adjust the original 2D artwork 200 such that when deformed, the decorative image aligns to the 3D relief mold.

For example, the adjusted 2D artwork created at step 126 is used to create a mirror image outline of the adjusted 2D artwork that is then printed onto a blank carrier ($2^{nd}$ iteration of step 116). The printed carrier is positioned face down in a vacuum forming machine ($2^{nd}$ iteration of step 118) and is vacuum formed to the permanent model ($2^{nd}$ iteration of step 120). An operator then examines the deformed adjusted outline to determine whether or not the outline aligns with the 3D impression formed in the carrier ($2^{nd}$ iteration of step 122). If the deformed outline still does not align to the 3D impression ("No" branch of decision step 122), then the operator measures the movement of the adjusted outline with respect to the 3D impression ($2^{nd}$ iteration of step 124) and adjusts the artwork a second time based on the measurements ($2^{nd}$ iteration of step 126).

Figure 1C:
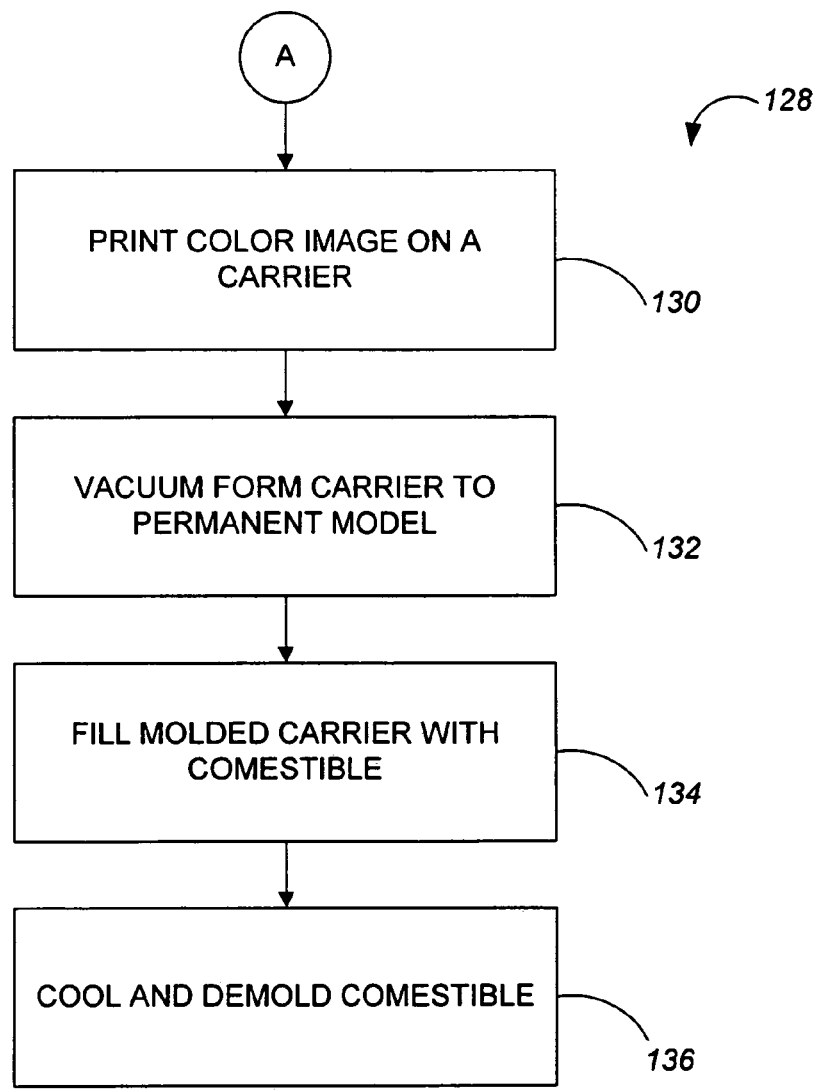

If the deformed outline does align to the 3D impression ("Yes" branch of decision step 122), then the adjusted artwork that was used to create the deformed outline has been adjusted sufficiently from the original 2D artwork 200, such that when deformed the decorative image aligns to the 3D relief mold. Referring to FIG. 1C, the adjusted artwork is used to print a corresponding colored decorative image onto a carrier (step 130). For example, if a screen printing process is used to print onto the carrier, then a multi-step process may be used to print the color image, for example, if multiple colors are required to create the colored image.

Figure 8:
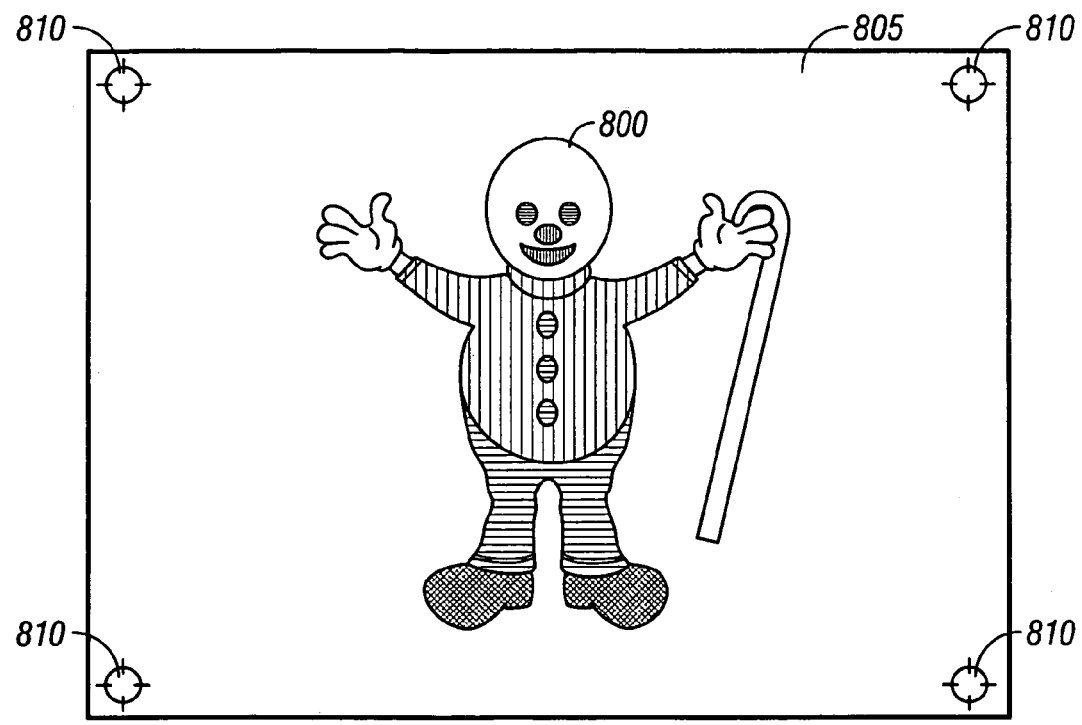
FIG. 8 shows a colored, disproportionate 2D artwork.

FIG. 8 shows the Cartoon Man 800 printed in color on a carrier 805. The targets 810 shown in the corners of the carrier 805 can be used to align the screens used in a multi-step process to the carrier 805, such that the colored image printed onto the carrier 805 with respect to each screen is in alignment. Alternative methods of printing can be used, such as offset printing, thermal transfer, ink jetting, and the like. The colored decorative image can be printed using an edible ink composition, such as the composition described below.

The color printed carrier 805 is vacuum formed to the permanent model 310 (step 132), thereby creating a 3D relief mold with the colored decorative image 800 adhered to the mold surface. If a male mold tool is used, such as the permanent model described in the illustrative example above, then the colored image is adhered to an interior surface of the mold. Alternatively, a female (i.e., concave) mold tool can be used, in which case the colored image is adhered to an exterior surface of the mold. The color is applied using an edible ink mixture, described further below.

The relief mold can either be filled with an edible material (step 134), for example, a jelly, fudge, chocolate or a chocolate compound, or the relief mold can be stored for later use. To fill the relief mold with an edible material, the carrier 805 is trimmed, if necessary, to fit within a filling machine. Suitable machines are available from Knobel in Switzerland. The jelly, fudge, chocolate or chocolate compound is melted and deposited into the relief mold. For example, chocolate can be melted to a temperature of approximately 35–50° Celsius. The filled relief mold is cooled, for example, by passing the filled relief mold through a cooling tunnel. Suitable cooling tunnels are available from Sollich of Peterborough, United Kingdom. In one implementation, a relief mold filled with chocolate or a chocolate compound is cooled to 5° C. for approximately 15 minutes. Once the edible material has cooled to a temperature at which the edible material is self-supporting, the edible material is removed from the mold (step 136) with the color image adhering to a surface of the edible material.

Figure 9:
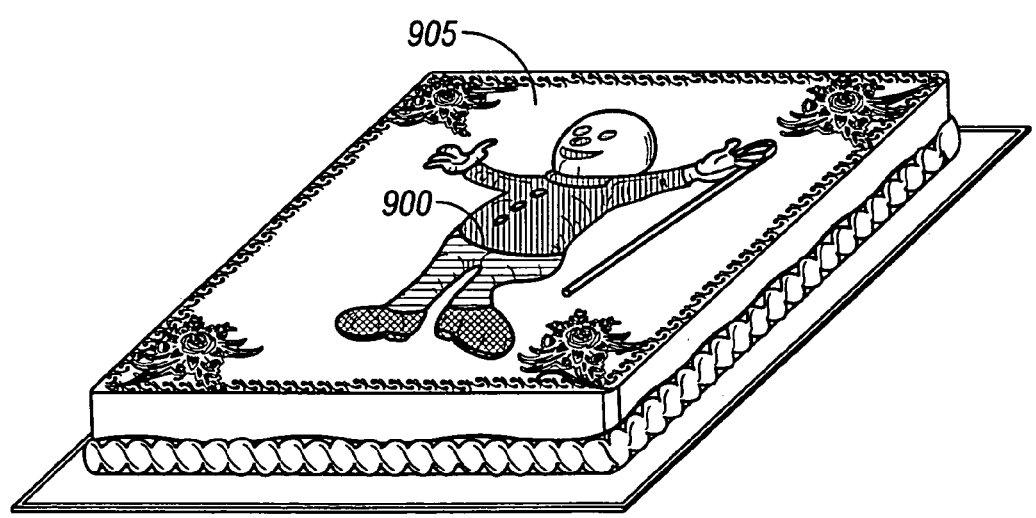
FIG. 9 shows a 3D comestible product adorning a bakery item.

The demolded comestible product may be an edible chocolate figurine or may be used as a cake adornment, for example. FIG. 9 shows a finished 3D comestible product 900 with the Cartoon Man decorative image applied to a non-planar surface of the product 900, which product 900 is used to adorn the top of a cake 905.

Once a suitably adjusted 2D artwork has been arrived at using the techniques described above in reference to FIG. 1B, multiple relief molds can be produced at the same time for mass producing the desired comestible product. Multiple decorative images can be applied to a single carrier, and a corresponding number of multiple permanent models affixed to a single substrate. The carrier can then be vacuum formed to the substrate, thereby forming multiple relief molds from the carrier. The carrier can be cut to separate the multiple relief molds.

In one implementation, an empty relief mold can be stored for at least six months before being filled with an edible material. An empty relief mold can be stored at ambient temperature in a sealed bag or other such packaging providing a good moisture vapor barrier. The edible material can be stored in the mold for at least 18 months before being demolded. A filled mold can be stored in chilled conditions, for example, at a temperature of approximately 0 to 10° C., to maintain freshness.

Exemplary packaging materials for packaging an empty or filled mold can include polypropylene films, polyester films such as MYLAR® (available from E.I. du Pont de Nemours and Company of Wilmington, Del.), foils (e.g., aluminum) and the like, and may be packed in a sturdy corrugated box to prevent damage.

In one implementation, a comestible product may be formed from two or more different portions. For example, referring to the Cartoon Man cake adornment 900 shown in FIG. 9, in the process described above, the Cartoon Man cake adornment 900 was formed from a single relief mold as a one-piece comestible product. However, in an alternative embodiment, the Cartoon Man cake adornment 900 can be formed from multiple pieces, such as a separate piece for the head, separate pieces for the arms and separate pieces for the legs. That is, five separate comestible products can be formed and then assembled together on top of the cake 905 to form the Cartoon Man cake adornment 900. Each separate comestible product is formed separately using the techniques described above in reference to the Cartoon Man (as a whole). This multi-step process can be preferred when creating fragile comestible products that may break, for example, at points of weakness, such as where the arm attaches to the body, or the like.

Edible Ink Compositions

Edible ink compositions described herein can be screen printed in a four-color process, for example, and are easily transferable from formed plastic molds and carriers to a comestible product. An edible ink composition can include one or more of each of the following: a viscosity controller, a film forming compound; an emulsifier; and a food grade colorant. Optional ingredients can include one or more plasticizers or humectants. For application to a carrier, an edible ink composition is typically prepared as an aqueous solution.

Viscosity Controllers

One or more viscosity controllers can be used to provide structure and viscosity to an edible ink composition, e.g., to facilitate application to a carrier. Examples include various food grade starches and sweeteners. Starches in unrefined, refined, unmodified or modified form can be used. Exemplary starches include maize (corn), potato, wheat, and tapioca starch. Exemplary sweeteners include glucose, lactose, dextrose, fondant icing sugar, and icing sugar.

The total amount of viscosity controllers can range from about 65% to about 80% by weight of an aqueous edible ink composition, or any value therebetween (e.g., 66, 67, 68, 69, 70, 71, 72, 73, 74, 75, 76, 77, 78, 79% by weight). In some embodiments, the total amount of viscosity controllers can range from about 70% to about 75% by weight of an aqueous edible ink composition, or any value therebetween. In certain embodiments, the total amount of viscosity controllers will range from about 72% to about 74% by weight of an aqueous edible ink composition. For example, fondant icing sugar can be used at about 73% by weight.

Starches and sweeteners for use as viscosity controllers can be purchased commercially from a variety of sources, e.g., Penford Foods, Englewood Colo.

Film Forming Compounds, Plasticizers, and Humectants

One or more film forming compounds can be used to provide bendability, flexibility, and peelability to an edible ink composition, e.g., to facilitate its removal from a carrier and transfer to a comestible product. Exemplary film forming compounds include hydroxypropylmethylcellulose and methylcellulose. Gum compounds can also be used as film forming compounds. For example, guar, acacia, or arabic gums can be used as a film forming compound.

One or more film forming compounds can be included in an amount ranging from about 0.6% to about 4% by weight of an aqueous edible ink composition, or any value therebetween (e.g., 0.8%, 0.9%, 1.0%, 1.2%, 1.4%, 1.6%, 1.8%, 2%, 2.2%, 2.4%, 2.6%, 2.8%, 3%, 3.2%, 3.4%, 3.6%, or 3.8%). In some embodiments, one or more film forming compounds can be included in an amount ranging from about 0.8% to about 1.4% by weight of an aqueous edible ink composition, or any value therebetween (e.g., 0.9%, 1%, 1.1%, 1.2%, or 1.3%). For example, hydroxypropylmethylcellulose can be included in an amount of about 0.8% by weight.

In some embodiments, one or more plasticizers and/or humectants are also included in an aqueous edible ink composition. Plasticizers and/or humectants can be used to retain moisture and impart flexibility. One or more humectants or plasticizers, or both, can be included in a total amount from about 0.03% to about 0.4% by weight of an aqueous edible ink composition, or any value therebetween (e.g., 0.04, 0.05, 0.06, 0.07, 0.08, 0.1, 0.12, 0.15, 0.18, 0.2, 0.22, 0.25, 0.28, 0.3, 0.32, 0.35, 0.38%). A typical plasticizer for use in a composition described herein is propylene glycol; a typical humectant is glycerine. For example, in some embodiments, propylene glycol is included in an amount of about 0.06% by weight of an aqueous edible ink composition.

Emulsifiers

An edible ink composition can include one or more emulsifiers. An emulsifier can help to ensure homogeneity of an edible ink composition and to maintain the clarity of an image applied to a comestible. Suitable emulsifiers include, for example, lecithin, polyglycerol polyricinoleate, acetic esters of monoglycerides, polyoxyethylene sorbitan monostearate (e.g. a commercially available product known as POLYSORBATE 60, CRILLET, CRILLET VEG A, TWEEN, or TWEEN 60), and combinations thereof.

The choice of emulsifier can be influenced by the nature of the comestible to which the colored decoration is to be applied. For example, for chocolate comestibles, lecithin may be useful, while POLYSORBATE 60 may be used for sugar-based confections, such as hard candies or fudge. In other embodiments, a mixture of emulsifiers can be used. A useful emulsifier mixture can include lecithin and POLYSORBATE 60.

The total amount of emulsifiers in an aqueous edible ink composition can range from about 1% by weight to about 12% by weight, or any value therebetween (e.g., 1.2, 1.5, 2, 2.2, 2.5, 2.6, 2.8, 2.9, 3, 3.2, 3.5, 3.8, 4, 4.2, 4.5, 4.8, 5, 5.2, 5.5., 5.8, 6, 6.2, 6.5, 6.8, 7, 7.2, 7.5, 7.8, 8, 8.2, 8.5, 8.8, 9, 9.2, 9.5, 9.8, 10, 10.2, 10.5, 10.8, 11, 11.2, 11.5, or 11.8%). For example, a mixture of lecithin and POLYSORBATE 60 can be used, where the lecithin ranges from about 3% to about 7% by weight of an aqueous edible ink composition, and the POLYSORBATE 60 ranges from about 0.5% to about 5% by weight of an aqueous edible ink composition. In one embodiment, lecithin is used in an amount of about 5.8% and POLYSORBATE 60 is used in an amount of about 2.9%.

Food Grade Colorant

An aqueous edible ink composition can include one or more food grade colorants. As used herein, colorants include color enhancing agents and whitening or opacifying agents. Suitable colorants can be, for example, whiteners, colorants, inks, dyes, or pigments. Any known colorant approved for human consumption can be used, including, for example, carmoisine, quinoline, ponceau 4R, blue 1, vegetable carbon, blue V, blue 2, and FD&C pigments such as yellow 5, red 3, red 40, blue 1, and blue 2. Additional useful examples include powdered inks, e.g., E100, E102, E104, E110, E120, E122, E124, E127, E129, E131, E132, E133, E140, E141, E153, 160, E161(b), E163, E170, and E171. Typically, a food grade colorant for use herein is soluble in aqueous solutions.

A colorant, e.g., a powdered ink, is added in an amount quantum satis, or an amount necessary to achieve the desired color and intensity required for a particular colored decoration. For example, a powdered ink may be used at a pigment level between 5% and 30% of the powdered ink. Typically, a colorant such as a powdered ink is added in an amount of about 0.01% to about 0.4% by weight of an aqueous edible ink composition, or any value therebetween (e.g., 0.02, 0.04, 0.06, 0.08, 0.1, 0.12, 0.14, 0.16, 0.18, 0.2, 0.22, 0.24, 0.26, 0.28, 0.3, 0.32, 0.34, 0.36, or 0.38%), although amounts outside these ranges can be used in particular cases to achieve a desired color intensity.

Water

Water is typically included in an amount of from about 13% to about 25% by weight of an aqueous edible ink composition, or any value therebetween (e.g., about 14, 14.2, 14.5, 14.8, 15, 15.2, 15.5, 15.8, 16, 16.2, 16.5, 16.7, 16.8, 17, 17.2, 17.5, 17.8, 18, 18.2, 18.5, 18.8, 19, 19.2, 19.5, 19.8, 20, 20.2, 20.5, 20.8, 21, 21.2, 21.5, 21.8, 22, 22.2, 22.5, 22.8, 23, 23.2, 23.5, 23.8, or 24% by weight). Certain embodiments have about 13% to about 18% water. For example, one embodiment includes about 16.77% water. Once prepared, a colored aqueous edible ink composition can be used to achieve a four color process set or block print set, as described previously.

Exemplary Edible Ink Composition

Edible ink compositions are typically aqueous solutions and can be prepared using the previously described components at the previously indicated percentage by weight amounts. For example, a useful edible ink composition can be an aqueous edible ink composition comprising:

a) one or more viscosity controllers at about 73% to about 75% by weight of said aqueous edible ink composition;

b) one or more film forming compounds at about 0.5% to about 1.4% by weight of said aqueous edible ink composition;

c) one or more emulsifiers at about 5% to about 12% by weight of said aqueous edible ink composition;

d) one or more plasticizers at about 0.03% to about 0.09% by weight of said aqueous edible ink composition; and e) water at about 12% to about 20% by weight of said aqueous edible ink composition.

In certain embodiments, the one or more viscosity controllers is fondant icing sugar; the one or more film forming compounds is hydroxypropylmethylcellulose; the one or more emulsifiers are lecithin and POLYSORBATE 60; and the one or more plasticizers is propylene glycol. For example, in a specific embodiment, an aqueous edible ink composition can be prepared with the following ingredients (amounts by weight %):

|  | % by Weight |
|---|---|
| Dry Ingredients | |
| Fondant Icing (powdered) sugar | 73.341 |
| Hydroxypropylmethylcellulose | 0.8 |
| Liquid Ingredients | |
| POLYSORBATE 60 | 2.94 |
| Propylene Glycol | 0.06 |
| Lecithin | 5.88 |
| Water | 16.77 |

Methods for Preparing an Edible Ink Composition

An exemplary method for preparing an edible ink composition can include dissolving or dispersing one or more film forming compounds and optional plasticizers and/or humectants in water using, for example, a high shear hand blender or Silverson Homogeniser. The aqueous mixture of film forming compounds (with optional plasticizers or humectants) is referred to as a membrane mixture. One or more food grade colorants can then be added and similarly dispersed in the aqueous membrane mixture. The viscosity controller, e.g., fondant icing (powdered) sugar, is then mixed with the membrane mixture in a similar manner. Finally, one or more emulsifiers, e.g., lecithin and POLYSORBATE 60, are added and mixed in using, e.g., a Silverson Homogeniser, until a smooth liquid results.

The material used to fill the mold (e.g., chocolate or chocolate compound) can be prepared accordingly to conventional techniques, and may include some or all of the following ingredients:

| a. | icing or fondant icing (powdered) sugar; |
|---|---|
| b. | lactose; |
| c. | lecithin; |
| d. | cocoa butter; |
| e. | butterfat; |
| f. | hydrogenated vegetable oil; |

-continued

| | |
|---|---|
| g. | whey powders; |
| h. | milk powders; |
| i. | whole milk; |
| j. | skim milk powder; |
| k. | full cream milk; |
| l. | gelatine; |
| m. | citric acid; |
| n. | starch/modified starch; |
| o. | pectin; and/or |
| p. | corn syrup |

A number of embodiments of the invention have been described. Nevertheless, it will be understood that various modifications may be made without departing from the spirit and scope of the invention. Accordingly, other embodiments are within the scope of the following claims.

What is claimed is:

1. A method for creating a relief mold, the method comprising:
    applying an image using an edible ink composition onto a substantially planar carrier, the image being disproportionate relative to an original version of the image; and
    forming a three dimensional impression in the carrier to form a non-planar relief mold for a comestible material, such that the three dimensional impression formed in the carrier corresponds to a three dimensional representation of the original version of the image and wherein the image applied to the carrier is in register with the three dimensional representation.

2. The method of claim 1, wherein a boundary of the image applied to the carrier is in register with a boundary of the three dimensional impression formed in the carrier.

3. The method of claim 1, wherein forming a three dimensional impression in the carrier to form a non-planar relief mold comprises:
    creating a vacuum between a surface of a three dimensional non-planar model corresponding to a three dimensional representation of the original version of the image and a carrier and vacuum forming the carrier to the surface of the model.

4. The method of claim 3, wherein the surface of the model is coated with a heat resistant, non-stick material.

5. The method of claim 1, further comprising:
    depositing a comestible material into the relief mold to substantially overlie the image; and
    removing the comestible material with the image applied thereto from the relief mold.

6. The method of claim 1, wherein the image comprises a multi-color image.

7. The method of claim 1, wherein the carrier comprises a thermoplastic sheet.

8. The method of claim 1, wherein applying an image onto a substantially planar carrier includes:
    screen printing one or more colors comprising the image onto the carrier using one or more colors of the edible ink composition.

9. The method of claim 8, wherein the edible ink composition comprises:
    a) one or more viscosity controllers;
    b) one or more film forming compounds;
    c) one or more emulsifiers; and
    d) one or more food grade colorants.

10. The method of claim 9, wherein the edible ink composition further comprises one or more plasticizers.

11. The method of claim 9, wherein the edible ink composition further comprises one or more humectants.

12. The method of claim 9, wherein the edible ink composition further comprises water.

13. The method of claim 9, wherein the edible ink composition is an aqueous edible ink composition comprising:
    a) one or more viscosity controllers at about 65% to about 80% by weight of said aqueous edible ink composition;
    b) one or more film forming compounds at about 0.6% to about 4% by weight of said aqueous edible ink composition; and
    c) one or more emulsifiers at about 1% to about 12% by weight of said aqueous edible ink composition.

14. The method of claim 13, wherein the aqueous edible ink composition further comprises a plasticizer at about 0.03% to about 0.4% by weight.

15. The method of claim 13, wherein the aqueous edible ink composition further comprises water at about 13% to about 25% by weight.

16. The method of claim 13, wherein the aqueous edible ink composition further comprises a powdered ink.

17. A process of manufacturing an edible comestible product with a relief mold created by the method of claim 1, comprising:
    depositing an edible material into the three dimensional impression in the carrier so that the edible material contacts the edible ink composition applied to the carrier;
    cooling the edible material in the three dimensional impression in the carrier; and
    removing the edible material from the three dimensional impression so that at least a portion of the edible ink composition is affixed to the edible material.

18. The process of claim 17, further comprising temporarily storing the carrier in a moisture-barrier package after forming the three dimensional impression in the carrier and before depositing the edible material into the three dimensional impression of the carrier.

19. A method for creating a relief mold for a comestible product, comprising:
    a) creating a three-dimensional model based on an original two-dimensional artwork, the original two-dimensional artwork including an outline and one or more colored regions;
    b) printing an outline of the original two-dimensional artwork onto a substantially planar carrier;
    c) vacuum forming the printed carrier to the three-dimensional model thereby forming a three-dimensional impression in the printed carrier at a location coinciding with the outline printed on the carrier thereby deforming the outline, where the three-dimensional impression formed in the carrier is a three dimensional representation of the original two-dimensional artwork;
    d) measuring misalignment of the deformed outline to the three-dimensional impression and creating an adjusted two-dimensional artwork based on the original two-dimensional artwork and the measurements, the adjusted two-dimensional artwork including an adjusted outline;
    f) repeating steps b through d where the adjusted outline is printed onto a carrier in step b, until an outline of an adjusted two dimensional artwork printed on a carrier substantially aligns with a three-dimensional impres sion formed in the carrier, where said adjusted two-dimensional artwork thereby forms a final two-dimensional artwork;

g) printing a colored image corresponding to the final two-dimensional artwork onto a carrier; and h) vacuum forming the printed carrier to the three-dimensional model thereby creating a three-dimensional impression in the printed carrier that aligns to the colored image, where the three-dimensional impression forms a relief mold.

20. The method of claim 19, further comprising:
filling the relief mold with a comestible material.

21. The method of claim 20, further comprising:
removing the comestible material with the colored image adhered thereto from the relief mold.

22. The method of claim 19, wherein the carrier is a thermoplastic sheet.

23. The method of claim 19, wherein printing a colored image onto a carrier comprises:
screen printing a colored image onto a carrier using an edible ink composition.

24. The method of claim 23, wherein the edible ink composition comprises:
a) one or more viscosity controllers;
b) one or more film forming compounds;
c) one or more emulsifiers; and
d) one or more food grade colorants.

25. The method of claim 23, wherein the edible ink composition comprises:
a) about 73.3% by weight fondant icing sugar;
b) about 0.8% by weight hydroxypropylmethylcellulose;
c) about 2.9% by weight POLYSORBATE 60 and about 5.9% by weight lecithin;
d) about 0.06% propylene glycol; and
e) about 16.8% water.

26. A method for creating a relief mold, the method comprising:
applying an image using an edible ink composition onto a substantially planar carrier, the image being disproportionate relative to an original version of the image;

forming a three dimensional impression in the carrier to form a non-planar relief mold for a comestible material, such that the three dimensional impression formed in the carrier corresponds to a three dimensional representation of the original version of the image and wherein the image applied to the carrier is in register with the three dimensional representation; and temporarily storing the carrier in a moisture-barrier package after forming the three dimensional impression in the carrier and before the comestible material contacts the edible ink composition applied to the carrier.

27. The method of claim 26, wherein the relief mold is formed so that the disproportionate image is disposed on an interior surface of the relief mold.

28. The method of claim 26, wherein a boundary of the image applied to the carrier is in register with a boundary of the three dimensional impression formed in the carrier.

29. The method of claim 26, further comprising:
depositing the comestible material into the relief mold to substantially overlie the image; and
removing the comestible material with the image applied thereto from the relief mold.

* * * * *